(12) United States Patent
Huebner et al.

(10) Patent No.: US 10,131,263 B2
(45) Date of Patent: Nov. 20, 2018

(54) FOLDING CONSOLE FOR MOTOR VEHICLE SEAT

(71) Applicant: FORD GLOBAL TECHNOLOGIES, LLC, Dearborn, MI (US)

(72) Inventors: Annette Lynn Huebner, White Lake, MI (US); Kristin Ann Hellman, Walled Lake, MI (US); Ryan Patrick Welch, Ottawa Lake, MI (US); Matthew B. Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/383,107

(22) Filed: Dec. 19, 2016

(65) Prior Publication Data

US 2018/0170232 A1 Jun. 21, 2018

(51) Int. Cl.
*A47B 5/00* (2006.01)
*B60N 3/10* (2006.01)
*B60R 7/04* (2006.01)
*B60N 3/00* (2006.01)

(52) U.S. Cl.
CPC ............. *B60N 3/102* (2013.01); *B60N 3/001* (2013.01); *B60N 3/002* (2013.01); *B60R 7/04* (2013.01); *B60R 7/043* (2013.01)

(58) Field of Classification Search
CPC ... B60R 7/04; B60R 11/00; B60R 2011/0014; B60R 7/043; B60N 2/4686; B60N 3/102; B60N 3/001; B60N 7/043; A47B 83/02; A47B 5/04; A47B 5/116
USPC ......... 296/24.34, 37.1, 37.8, 37.14; 224/400, 224/539, 542, 275, 484, 485, 545, 548, 224/553, 926, 929, 933; 297/400, 539, 297/542, 275, 484, 485, 545, 548, 553, 297/926, 929, 933; 108/77, 78, 79, 80, 108/81, 82, 162, 164, 176, 179, 42, 44
See application file for complete search history.

(56) References Cited

U.S. PATENT DOCUMENTS

| | | | | |
|---|---|---|---|---|
| 3,338,629 A * | 8/1967 | Drees | ..................... | B60N 3/002 224/275 |
| 5,316,368 A * | 5/1994 | Arbisi | .................. | B60N 2/4686 224/275 |
| 5,413,400 A * | 5/1995 | Llanes | ..................... | A47C 4/10 297/154 |
| 5,588,697 A * | 12/1996 | Yoshida | ................. | A47B 13/16 108/160 |
| 6,419,314 B1* | 7/2002 | Scheerhorn | .......... | B60N 2/4646 296/37.8 |
| 6,746,065 B1* | 6/2004 | Chan | ..................... | B60N 2/468 296/24.34 |

(Continued)

FOREIGN PATENT DOCUMENTS

DE 202015104290 * 12/2015
JP 3384250 B2 3/2003

OTHER PUBLICATIONS

English Machine Translation of JP3384250B2.

(Continued)

*Primary Examiner* — Janet M Wilkens
(74) *Attorney, Agent, or Firm* — Vichit Chea; King & Schickli, PLLC

(57) ABSTRACT

A folding console is provided. That folding console includes a support, a panel connected by a first pivot to the support and a flap connected by a second pivot to the panel.

12 Claims, 6 Drawing Sheets

(56) References Cited

U.S. PATENT DOCUMENTS

| | | | |
|---|---|---|---|
| 6,851,736 B1* | 2/2005 | Klopp, III | B60R 7/04 224/926 |
| 6,929,304 B1* | 8/2005 | Dry | A47C 7/72 224/539 |
| 7,007,994 B2 | 3/2006 | Kubota et al. | |
| 7,114,755 B1* | 10/2006 | Sturt | B60N 3/102 296/24.34 |
| 7,490,896 B2 | 2/2009 | Smith | |
| 7,739,963 B2* | 6/2010 | Chou | B60N 2/42727 108/44 |
| 7,891,623 B2 | 2/2011 | Haddad et al. | |
| 8,763,538 B2 | 7/2014 | Fukuhara | |
| 8,911,011 B2* | 12/2014 | Andersson | B60N 2/4613 297/188.14 |
| 9,085,244 B2 | 7/2015 | Tsuchida | |
| 2003/0085245 A1* | 5/2003 | Chiku | B60N 2/4686 224/275 |
| 2003/0122392 A1 | 7/2003 | Larsen et al. | |
| 2005/0127725 A1* | 6/2005 | Satani | B60N 2/305 297/188.08 |
| 2005/0161480 A1* | 7/2005 | Tirey | B60R 7/043 224/275 |
| 2006/0071497 A1* | 4/2006 | Radu | B60N 2/46 296/24.34 |
| 2007/0075559 A1* | 4/2007 | Sturt | B60R 7/04 296/37.8 |
| 2013/0328357 A1* | 12/2013 | Macleod | B60N 3/001 297/148 |

OTHER PUBLICATIONS

Auto Toyota Review, "2016 Toyota Highlander Hybrid", http://www.autotoyotareview.com/2015/10/2016-toyota-highlander-hybrid.html, printed Sep. 16, 2016, pp. 1-7.

* cited by examiner

FOLDING CONSOLE FOR MOTOR VEHICLE SEAT

TECHNICAL FIELD

This document relates generally to the motor vehicle equipment field and, more particularly, a new and improved folding console for a motor vehicle seat such as a second row seat of a three-row sport utility vehicle (SUV).

BACKGROUND

Significant demand exists today for motor vehicles such as SUVs having three rows of seating. Many such vehicles are equipped with two second row captain's chairs. Some users prefer a pass-through between the second row captain's chairs to allow easier access to the third row seating. Other users prefer a center console between the second row captain's chairs so as to provide the second row occupants with additional amenities which may be incorporated into such a center console.

This document relates to a new and improved folding console that may be placed in a stowed position to allow easy access to the third row seating or, alternatively, placed in a use position in order to provide enhanced amenities to the second row seating occupants. Thus, it should be appreciated that the folding console disclosed in this document provides enhanced versatility to meet the particular needs of the user at any given time. As such, the folding console increases user satisfaction and represents a significant advance in the art.

SUMMARY

In accordance with the purposes and benefits described herein, a folding console is provided. The folding console comprises (a) a support, (b) a panel connected by a first pivot to the support and displaceable between a stowed position and a use position and (c) a flap connected by a second pivot to the panel and displaceable between a home position and a deployed position. The support may comprise a motor vehicle seat assembly such as, but not necessarily limited to, a second row captain's chair in a three-seating-row SUV or other vehicle.

The flap may include a first face and a second face. The second face may be oriented toward the panel when the flap is in the home position and oriented upward when the flap is in the deployed position.

A convenience feature may be carried on the second face. That convenience feature may comprise a storage pocket. Alternatively, that convenience feature may comprise a device holder. The device holder may comprise a U-shaped bracket having a device retaining lip. In other alternative embodiments, the convenience feature may comprise both a storage pocket and a device holder.

In some of the many possible embodiments, the flap sweeps through an included angle of between 95° and 130° when displaced from the home position to the deployed position. As a consequence of this displacement angle, a device, such as electronic device held in the device holder, is positioned at a convenient viewing angle when the flap is in the deployed position.

The folding console may further include a cup holder carried on the panel. That cup holder may include a body having a cup well. The panel may also include a channel having an open front and a guide track along opposed sides of the channel. The body may slide along the guide track between a first position within the channel and a second position extending at least partially beyond the open front of the channel.

The cup holder may be concealed under the flap when the cup holder is in the first position and the flap is in the home position. Further, the cup holder may project at least partially forward of the flap when the cup holder is in the second position and the flap is in the home position.

In the following description, there are shown and described several preferred embodiments of the folding console. As it should be realized, the folding console is capable of other, different embodiments and its several details are capable of modification in various, obvious aspects all without departing from the folding console as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the folding console and together with the description serve to explain certain principles thereof. In the drawing figures.

Reference will now be made in detail to the present preferred embodiments of the folding console, an example of which is illustrated in the accompanying drawing figures.

DETAILED DESCRIPTION

Figure 1:
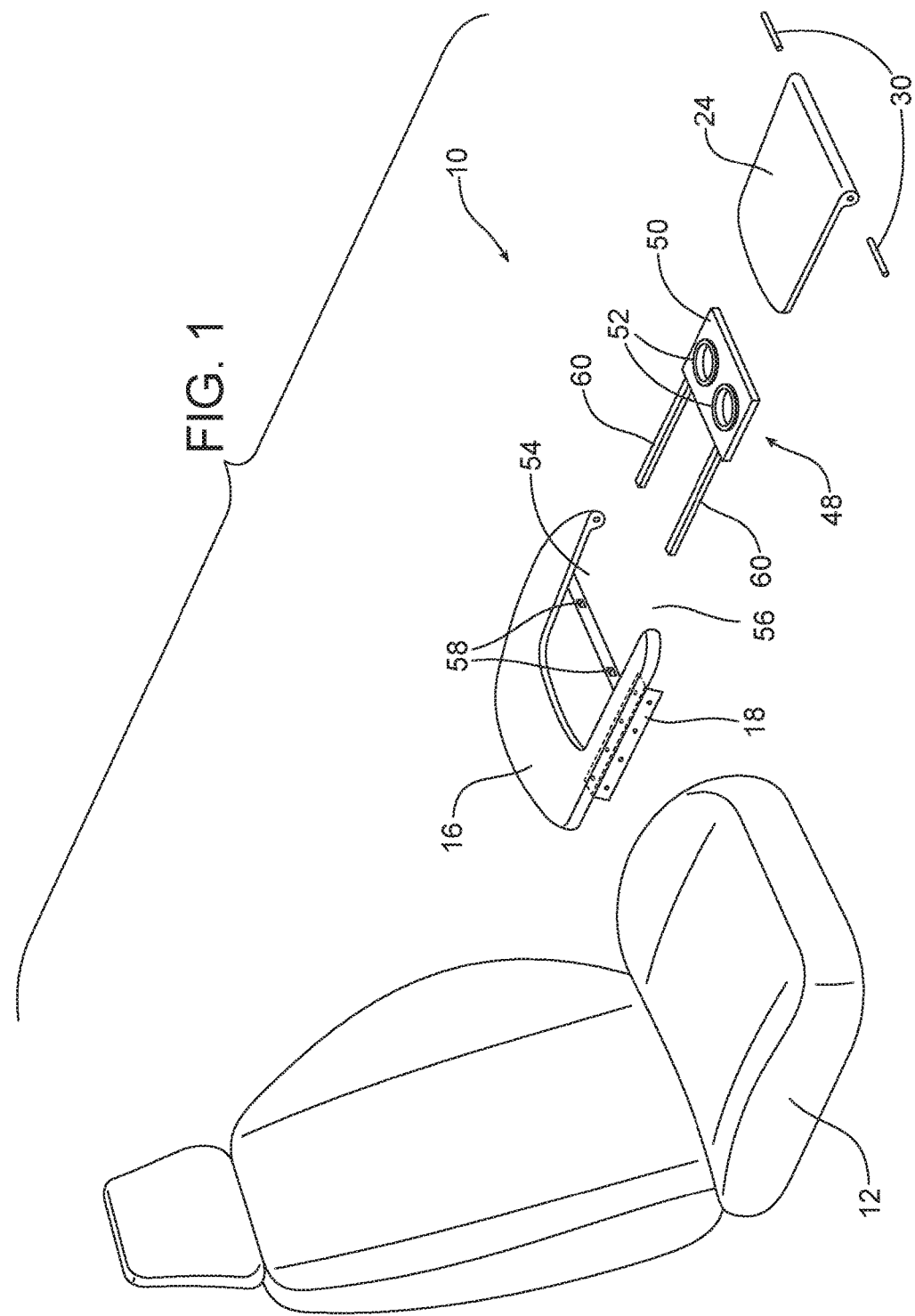
FIG. 1 is an exploded perspective view of the folding console.
Figure 3A:
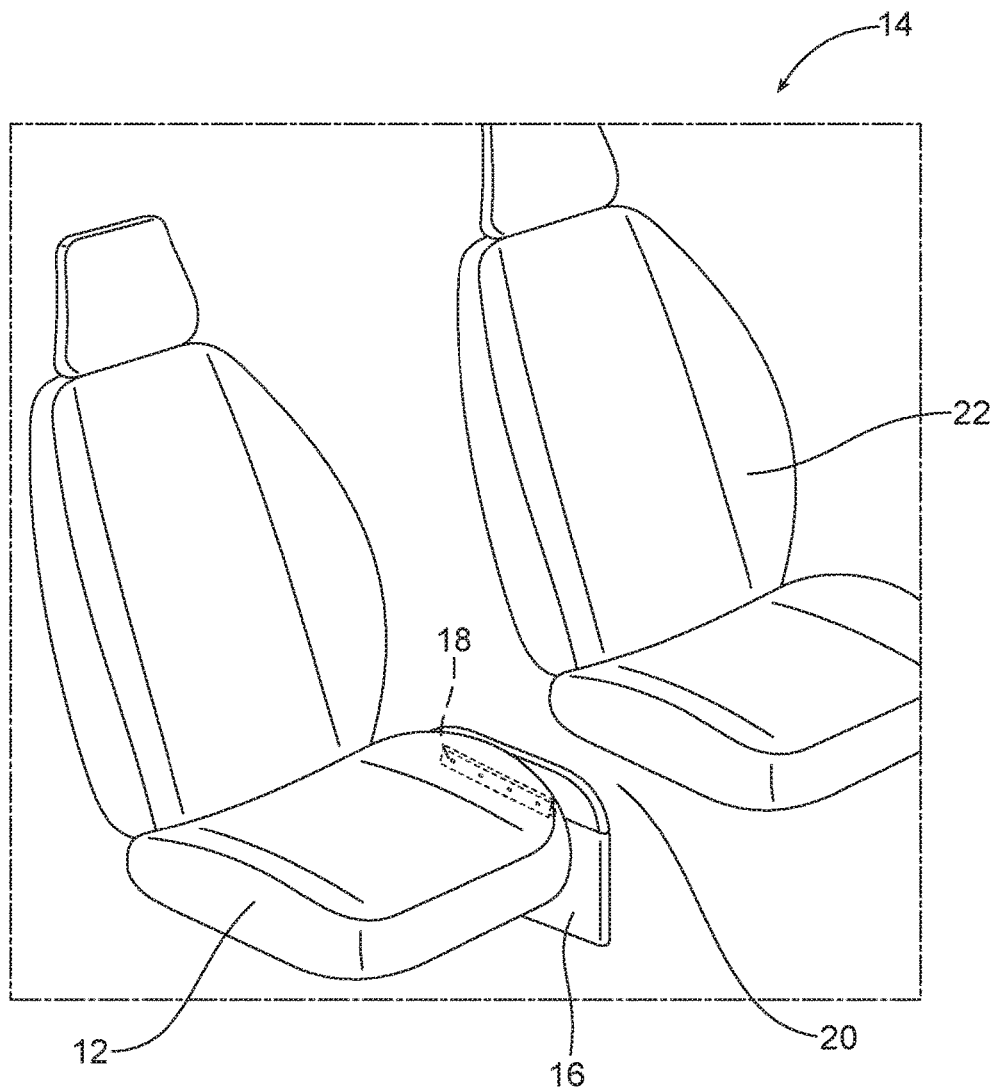
FIG. 3a is a perspective view illustrating the folding console with the panel in the stowed position, the flap in the home position and the cup holder in the first position.
Figure 3B:
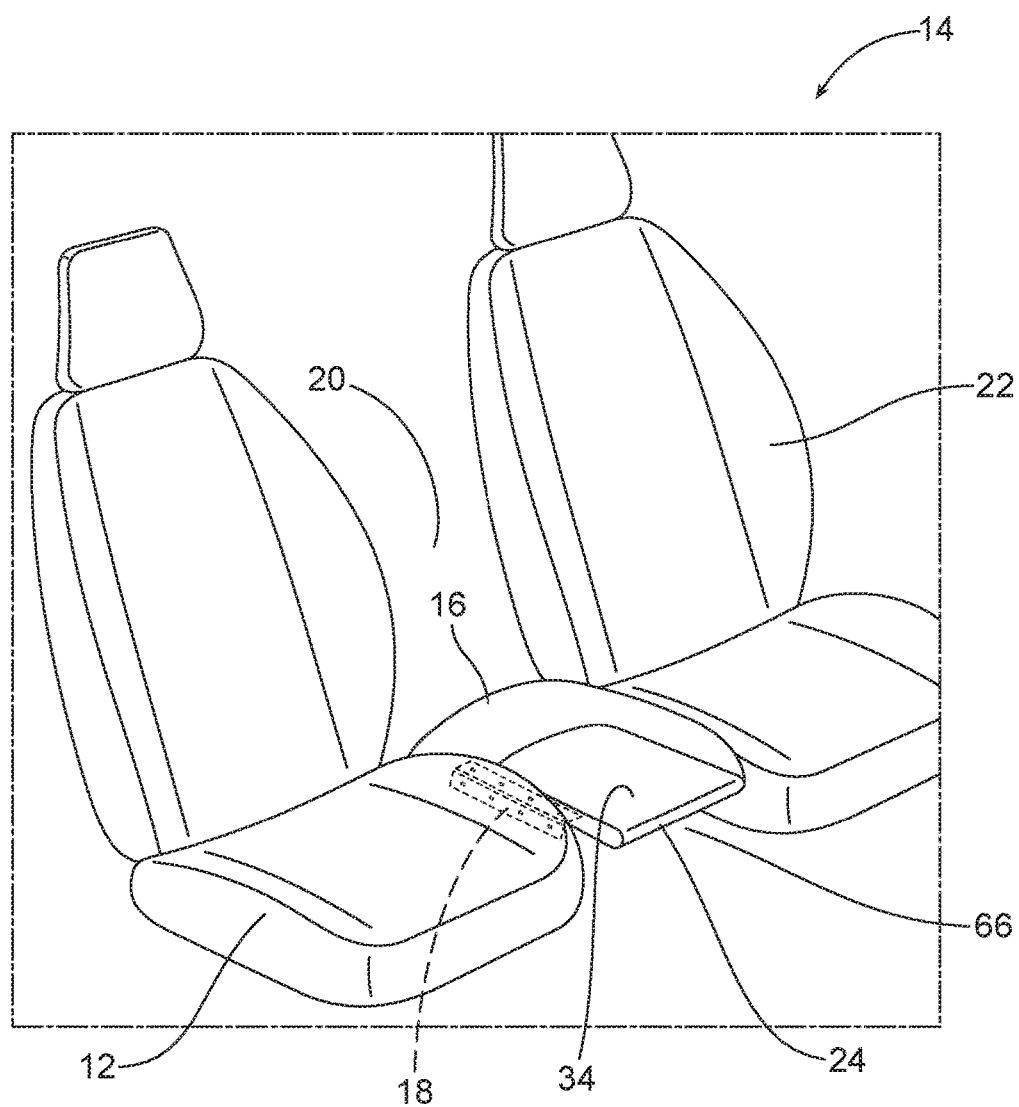
FIG. 3b is a perspective view of the folding console with the panel in the use position, the flap in the home position and the cup holder in the first position.
Figure 3C:
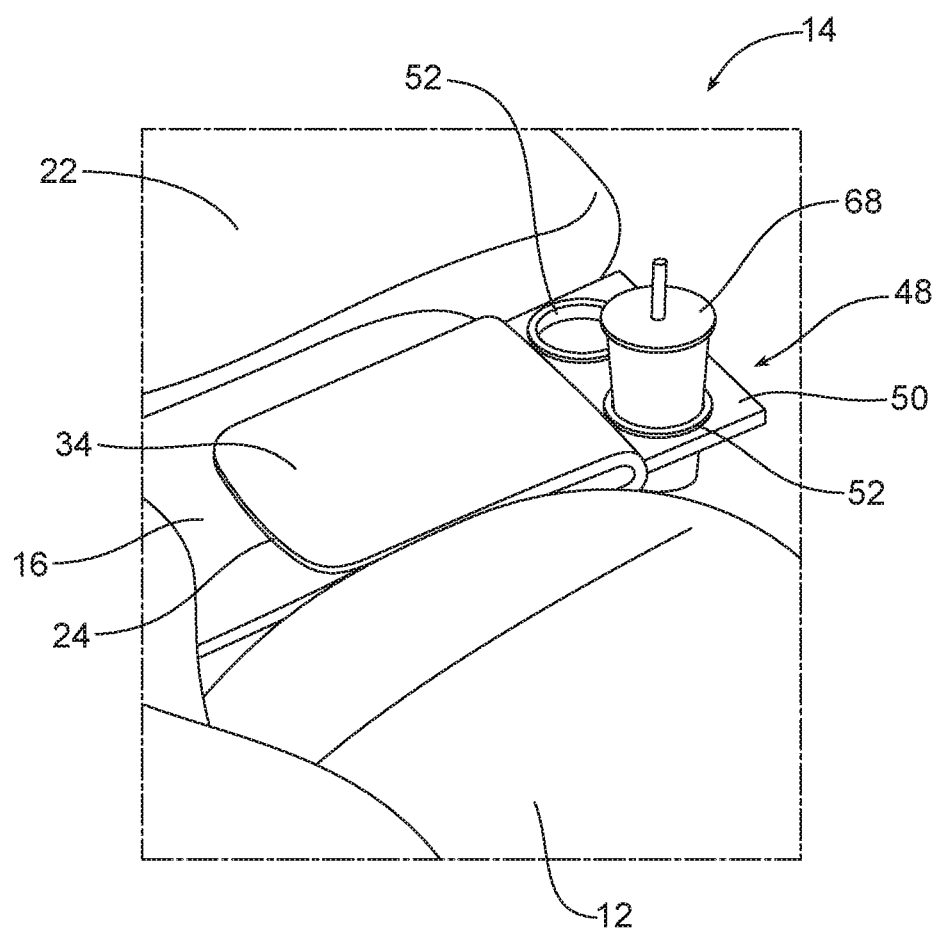
FIG. 3c is a perspective view of the folding console illustrating the panel in the use position, the flap in the home position and the cup holder in the second position.
Figure 3D:
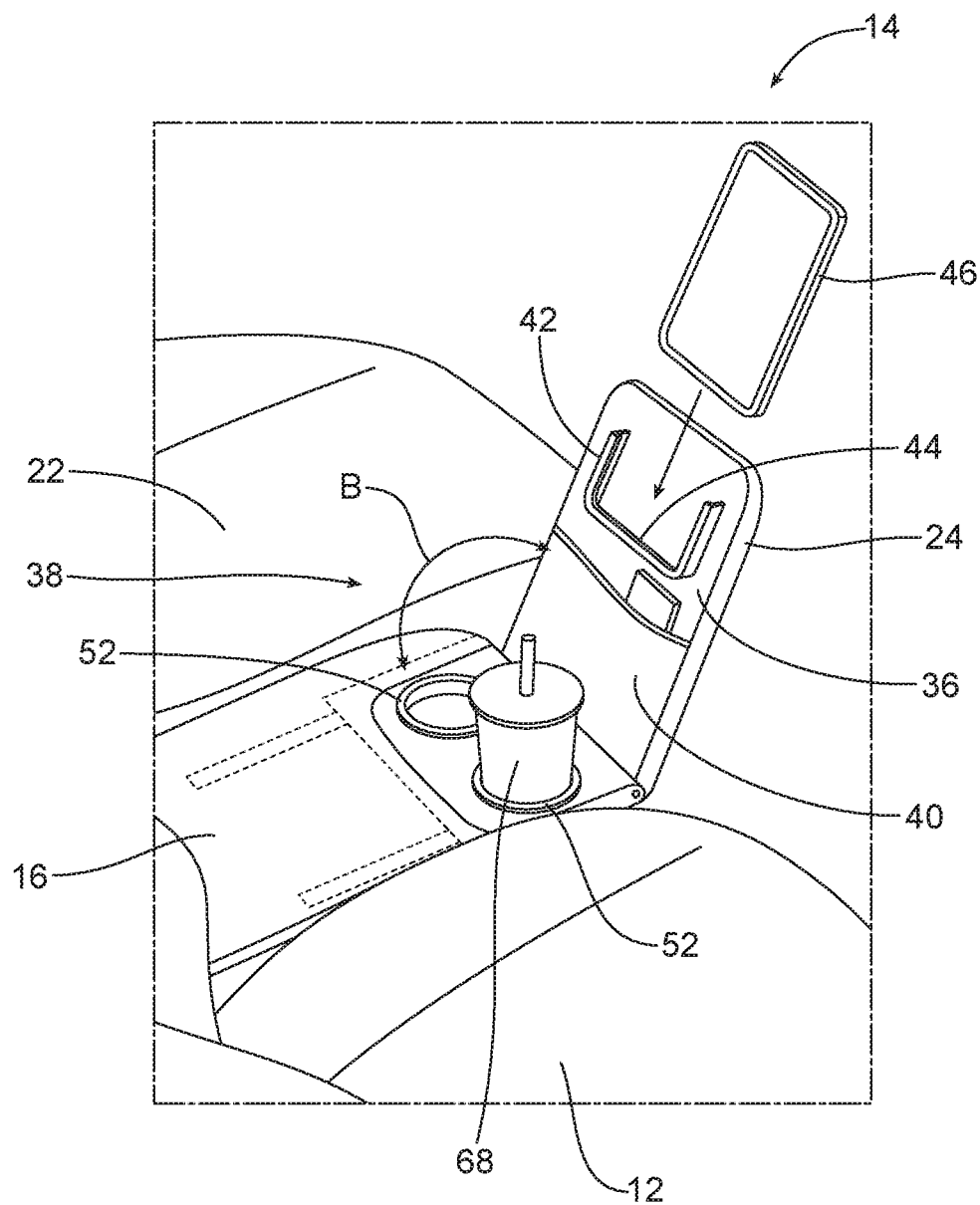
FIG. 3d is another perspective view illustrating the panel in the use position, the flap in the deployed position and the cup holder in the first position.

Reference is now made to FIG. 1 illustrating one possible embodiment of the folding console 10. The folding console 10 includes a support 12. In the illustrated embodiment the support 12 is a motor vehicle seat assembly, such as a captain's chair provided as a second row seat in a three seating row SUV 14 (see also FIGS. 3a-3d). A tray or panel 16 is connected by a first pivot 18 to the side of the support 12. In the illustrated embodiment, the first pivot 18 comprises a piano style hinge. As will be apparent from the following description, the panel 16 may be displaced about the first pivot 18 between (a) a stowed position, alongside the side of the support 12 as illustrated in FIG. 3a and (b) a use position, extending in a substantially horizontal position from the side of the support 12 as illustrated in FIGS. 3b-3d. Thus, in the use position the panel 16 extends across the gap 20 between the support 12 and the adjacent seat 22.

Figure 2:
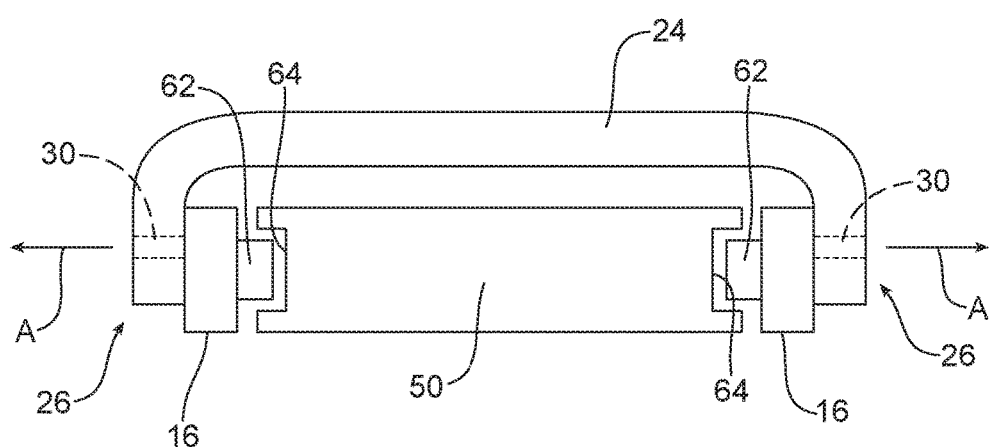
FIG. 2 is a front edge elevational view of an alternative embodiment of the assembled folding console.

A flap 24 is connected by a second pivot 26 to the panel 16 (see FIGS. 1 and 2). The flap 24 is displaceable between a home position resting flat against the panel 16 as illustrated in FIGS. 3a-3c and a deployed position projecting upward from the panel 16 as illustrated in FIG. 3d. In the illustrated embodiment, the second pivot 26 comprises two opposed lugs 28 on the flap 24 connected by two pivot pins 30 to the panel 16. As should be appreciated, the pivot pins 30 are aligned and define the pivot axis A.

As illustrated in FIGS. 1-3d, the flap 24 includes a first face 34 and a second face 36. The second face 36 is oriented toward the upper face of the panel 16 when the flap 24 is in the home position and oriented upward and rearward when the flap is in the deployed position.

In the illustrated embodiment, the flap 24 includes a convenience feature generally designated by reference numeral 38. In the illustrated embodiment, that convenience feature is carried on the second face 36 of the flap 24. The convenience feature 38 may comprise substantially any useful feature an individual might desire when sitting and/or riding in a motor vehicle. In the illustrated embodiment, the convenience feature comprises a flexible storage pocket 40 for holding papers, pens, cell phones or other articles and a device holder 42. More specifically, in the illustrated embodiment, the device holder 42 comprises a U-shaped bracket having a device retaining lip 44. As illustrated in FIG. 3d, the device holder 42 is sized and shaped to receive and hold a tablet computing device 46. As should be appreciated, the device retaining lip 44 engages the tablet computing device 46 and holds it in the device holder 42.

As should be appreciated from comparing FIGS. 3c and 3d, the flap 24 sweeps through an included angle or arc (note action arrow B) of between 95° and 130° when displaced from the home position illustrated in FIG. 3c to the deployed position illustrated in FIG. 3d. As a result, the tablet computing device 46 held in the device holder 42 is positioned at a convenient viewing angle for one sitting in the support 12 when the flap is in the deployed position.

As further illustrated in the drawing Figures, the folding console 10 may also include a cup holder 48 carried on the panel 16. More specifically, in the illustrated embodiment the cup holder 48 comprises a body 50 having two cup wells 52. For purposes of this document the term "cup well" reads on and includes any structure adapted for holding a cup including, but not limited to, a closed well, an open well, and even a simple aperture of appropriate size provided in the panel 16.

As should be further appreciated, the panel 16 includes a U-shaped cutout or channel 54 having an open front 56 and a guide track 58 in the form of two sockets. In the illustrated embodiment, the body 50 includes two extension arms 60 that engage and slide in the guide track 58. Thus, it should be appreciated that the body 50 slides along the guide track 58 between a first position wherein the cup holder 48 is held within the channel 54 and a second position wherein the cup holder extends at least partially beyond the open front end 56 of the channel 54. More specifically, in the second position, the body 50 is displaced forward sufficiently to present the cup well 52 forward of the front edge of the panel 16 and the pivot axis A defined between the two pivot pins 30 that connect the flap 24 to the panel. See FIG. 3c.

In the embodiment illustrated in FIG. 2, the opposed sides of the channel 54 include guide lugs 62 that engage in cooperating slots 64 in the sidewalls of the body 50. Such a structure helps guide, align and stabilize the cup holder 48 when in the retracted or first position.

The versatile and user friendly operation of the folding console 10 will now be described in detail with reference to FIGS. 3a-3d.

As illustrated in FIG. 3a, when the panel 16 is placed in the stowed position, the flap 24 is placed in the home position and the cup holder 48 is placed in the first position, the folding console 10 assumes a position directly alongside the support 12 thereby opening the gap 20 between the seat assembly or support 12 and the adjacent seat assembly 22. This allows one to more easily access the third row seat in the SUV 14.

When the panel 16 is in the use position, the flap 24 is in the home position and the cup holder 48 is in the first position as illustrated in FIG. 3b, the folding console 10 extends across the gap 20 between the support 12 and the adjacent seat 22 forming a convenient shelf for temporarily holding or storing items. Here it should also be noted that partially concealed additional storage 66 is provided underneath the folding console 10 between the support 12 and the adjacent seat 22 for use if desired.

When the panel 16 is in the use position, the flap 24 is in the home position, the cup holder 48 is in the second position as illustrated in FIG. 3c, the cup wells 52 may be conveniently accessed to hold a drink cup 68 or other beverage container.

In contrast, when the panel 16 is in the use position, the flap 24 is in the deployed position and the cup holder 48 is in the first position as illustrated in FIG. 3d, an individual sitting in the seat or support 12 may easily access items stowed in the storage pocket 40. Further, one enjoys a particularly fine viewing angle of the electronic device or tablet computing device 46 held in the device holder 42. At the same time, a drinking cup 68 may be conveniently placed in one or both of the cup wells 52.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A folding console, comprising:
   a support;
   a panel connected by a first pivot to said support and displaceable between a stowed position and a use position, wherein said panel includes a channel having an open front;
   a flap connected by a second pivot to said panel and displaceable between a home position covering the channel and a deployed position exposing the channel; and
   a cup holder carried on said panel wherein said channel includes a guide track along opposite sides of said panel inboard of said second pivot.

2. The folding console of claim 1, wherein said flap includes a first face and a second face and wherein said second face is oriented toward said panel when said flap is in said home position and oriented upward when said flap is in said deployed position.

3. The folding console of claim 2, further including a convenience feature carried on said second face.

4. The folding console of claim 3, wherein said convenience feature comprises a storage pocket.

5. The folding console of claim 3, wherein said convenience feature comprises a device holder.

6. The folding console of claim 5, wherein said device holder comprises a U-shaped bracket having a device retaining lip.

7. The folding console of claim 5, wherein said flap sweeps through an included angle of between 95° and 130° when displaced from said home position to said deployed position whereby a device held on said device holder is positioned at a convenient viewing angle when said flap is in said deployed position.

8. The folding console of claim 5, wherein said body slides along said guide track between a first position within said channel and a second position extending at least partially beyond said open front of said channel.

9. The folding console of claim 8, wherein said cup holder is concealed under said flap when said cup holder is in said first position and said flap is in said home position.

10. The folding console of claim 9, wherein said cup holder projects at least partially forward of said flap when said cup holder is in said second position and said flap is in said home position.

11. The folding console of claim 3, wherein said convenience feature comprises a storage pocket and a device holder.

12. The folding console of claim 1, wherein said cup holder includes a body having a cup well.

\* \* \* \* \*